Sept. 2, 1969 W. D. LESTER ET AL 3,464,190
COTTON PICKER LIFT CONTROL
Filed Aug. 2, 1966 2 Sheets-Sheet 1

INVENTORS
WILLIAM D. LESTER
MONROE C. BARRETT
BY John J. Kowalik
ATT'Y.

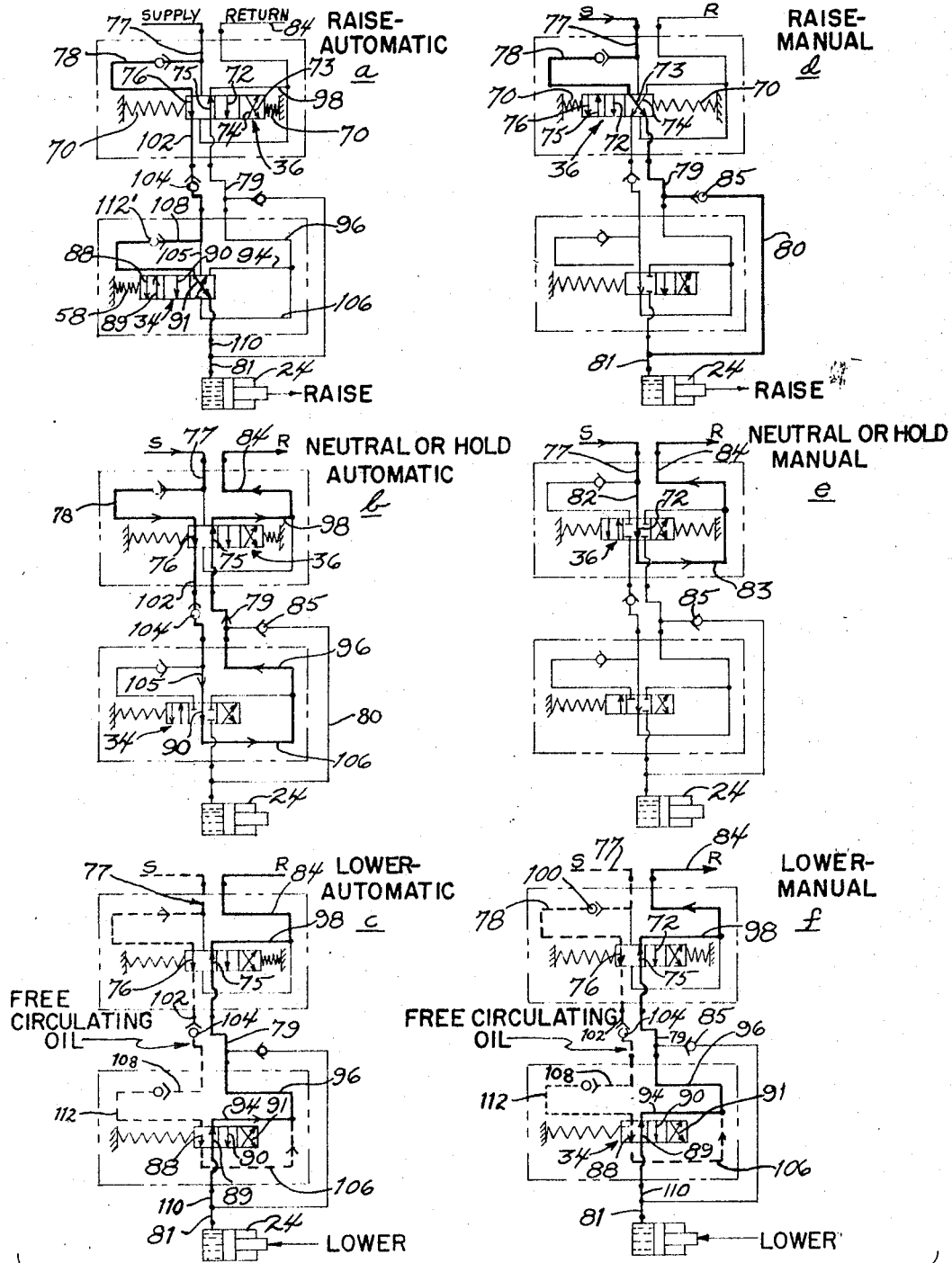

United States Patent Office 3,464,190
Patented Sept. 2, 1969

3,464,190
COTTON PICKER LIFT CONTROL
William D. Lester, and Monroe C. Barrett, Memphis, Tenn., assignors to International Harvester Company, Chicago, Ill., a corporation of Delaware
Filed Aug. 2, 1966, Ser. No. 569,748
Int. Cl. A01d 45/18
U.S. Cl. 56—11                                   5 Claims

ABSTRACT OF THE DISCLOSURE

A cotton harvester having a picker unit and including a hydraulic system having supply and return circuits interacting with a ram which is operative to lift and vertically position the units in response to corresponding conditions of automatic and manual control valves interconnected in the circuits for selective manual and automatic control of the unit, the manual valve connected to the supply and return circuits and selectively supplying the automatic valve and the ram to effect respective automatic and manual positioning of the unit, the automatic valve actuated by means responding to changes in ground contour and being serially connected in the return circuit between the ram and the manual valve to limit lowering of the unit to a predetermined optimum height and to maintain the unit at that height independent of supply pressure and fluid flow.

---

The present invention relates to a cotton picker lift control.

The invention relates more particularly to means for lifting and controlling the vertical movements of the picker units in a cotton picker.

It is desired, as is known, to have the picker units follow as close to the ground as possible so as to pick all of the cotton some of which is barely off of the ground, and sometimes on the ground. The ground is usually uneven and if the picker unit is set for a lowermost point of depression of the ground, it would dig into a high spot, to great disadvantage, and therefore, it is desired that the picker unit be mounted for vertical movement to follow the contour of the ground.

A broad object, therefore, of the present invention is to provide novel means for lifting the picker units of a cotton picker and control the vertical movements thereof, for causing the picker units to follow the contour of the ground.

Another object is to provide apparatus of the foregoing character utilizing the hydraulic system usually provided in such cotton pickers, and including a simple and novel valve means for controlling the hydraulic fluid and more particularly to switch the control between automatic to manual operation.

A still more specific object is to provide apparatus of the foregoing character in which a single manually settable valve is provided for (a) switching from automatic to manual operation, and (b) for effecting the various manually controlled movements of the picker units.

Other objects and advantages of the invention will appear from the following detailed description taken in conjunction with the accompanying drawings in which:

FIGURE 3 is a group of six hydraulic circuit diagrams, individually identified as a to f inclusive, showing the active portions of the circuit in each of the various steps or stages in the operation of the hydraulic system.

Figure 1:
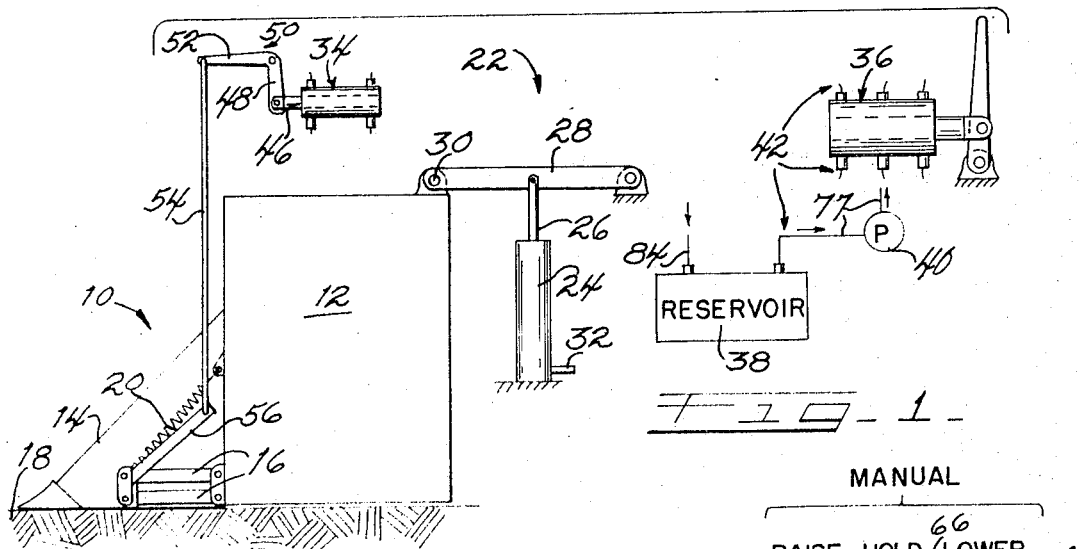
FIGURE 1 is a side view of a picker unit of a cotton picker, together with principal components of the hydraulic control system utilized for controlling the movements of the picker unit.

Referring now in detail to the accompanying drawings, attention is directed first to FIGURE 1 showing a picker unit 10 of known kind and incorporated in a cotton picker also of known kind. The picker unit includes a drum 12 and a pair of lifter shoes or units 14 (only one shown) mounted on the drum 12 by suitable means such as link 16 for pivotal vertical movement of the plant lifters relative to the drum. Although the description immediately following relates to a single picker unit 10, the invention is applicable to a plurality of such units, as will be referred to again hereinbelow.

As the cotton picker on which the picker unit 10 is mounted moves (to the left) along the ground indicated at 18, the plant lifter 14 rides on the ground, directly and closely following the contour of the ground, being lifted by protrusions in the ground and lowering in the depressions. If desired, tension springs 20 may be provided to partially counteract the weight of the plant lifters to facilitate their vertical movements in following the contour of the ground.

Means are provided, as will be described fully hereinbelow, for controlling the vertical movements of the drum 12 by the vertical movements of the plant lifter 14. This control is exercised by means of a hydraulic control system indicated in its entirety at 22 and including various valve means to be identified hereinbelow.

The drum 20 is lifted by means of a hydraulic ram 24 mounted on the frame of the cotton picker and having a piston 26 pivotally connected with an arm 28, itself pivoted on the frame of the machine and having its swinging end pivotally connected at 30 to the drum 12. The hydraulic ram 24 may be single acting and upon forcing of hydraulic fluid through a conduit 32 into it below the ram, the ram is extended and the drum raised. Upon release of the pressure forcing the fluid into the ram, the drum lowers under the action of gravity.

The hydraulic control system indicated at 22 includes a picker unit control valve 34 also referred to as an automatic valve, and a main control valve 36, also referred to as a manual valve. The system also includes a reservoir 38 and a pump 40 together with hydraulic lines indicated generally at 42 interconnecting the valves, the reservoir and the pump.

Figure 2:
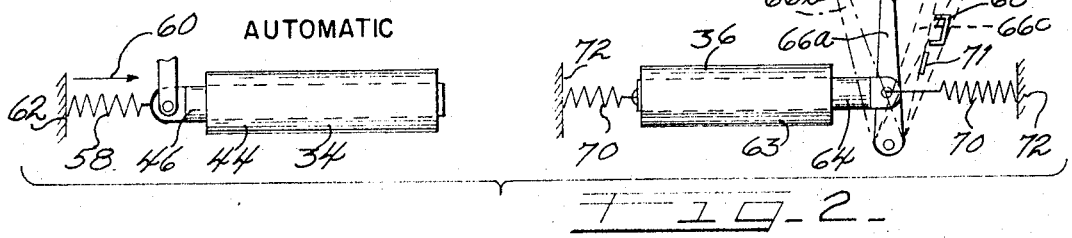
FIGURE 2 is a semi-diagrammatic view of certain valve means utilized in the control apparatus.

The valve 34, rigidly mounted on the drum 12 for movement therewith, includes a housing or casing 44 (see also FIGURE 2) and a spool or plunger 46 working therein. The valve 34 in itself may be of known mechanical construction, but is provided with certain control features characteristic of the present system. The spool 46 at its outer end is pivotally connected to one arm 48 of a bell crank lever 50 having another arm 52 pivotally connected with a link 54, the lower end of which is connected to an element 56 constituting a rigid and fixed part of the frame of the plant lifter 14. The plant lifter 14, upon being pivotally moved up or down, acts through the link 54 and swings the bell crank lever 50 and thereby moves the spool 46 in the valve 34, this movement in the illustrated instance being horizontally relative to the casing 44. The spool 46 is biased by a spring 58 in a predetermined direction (to the right) as indicated by the arrow 60, the spring acting against a fixed element 62 of the frame of the drum 12.

The valve 36 also in itself is of known mechanical construction but is provided with detail construction and capable of movement into various control positions in accordance with the characteristics of the control functions in the present arrangement. The valve 36 includes a housing 63 and a spool or plunger 64 slidable therein and pivotally connected at its outer end with a hand operated lever 66 movable between a middle position shown in full lines and opposite positions removed therefrom shown in dot-dash lines, and in one such position being retained by a detent 68 shown here diagrammatically. A yieldable abutment 71 is also provided for a purpose to be described hereinbelow. The spool 64 is normally retained in a neutral or central position by oppositely acting springs 70 connected between the spool and fixed elements 72 of the frame.

The selection of automatic or manual control is controlled by the manual valve 36. This valve can assume three operative positions; namely, "HOLD" or neutral position shown at 66a in full lines; "RAISE" position as shown at 66b in dot-dash lines; and "LOWER" position as shown in dot-dash lines at 66c; another position of the lever 66 is shown in dot-dash lines at 66d, but the positions 66c and 66d are identical from the standpoint of the function of the valve 36, the position 66d representing a locked position and in this position of the lever, the automatic valve 34 becomes operative. The detent 68 is operative for so locking the lever in the position 66d, but releasably so, and the yieldable abutment 71 is utilized for providing a "feel" to the operator to signal the lower position, i.e., position 66c, without necessarily moving it into locked position 66d. However, it can easily and quickly be so locked by the operator when he desires to do so. For purposes of convenience in the description of the operation of the valves, the manual operation will be considered first. Attention is directed to FIGURE 3 in connection with the following description of the operation of the valves. In this figure, the heavy lines in the different circuits represent the active portions thereof, the dotted lines indicating idle or circulating fluid flow.

A starting position is assumed in which the lever 66 is in the locked position 66d. This position not only is lower position, but also, automatic, i.e., it puts the automatic valve 34 actively in the circuit. Also, it is assumed the operator wishes to raise the drum 12 under manual control, and thus moves the lever 66 to the raise position 66b, and sets up a circuit according to FIGURE 3d. The three positions of the valve are represented in FIGURE 3, the valve including passages 72, 73, 74, 75, and 76. In the position 66b of the lever, a pressure line is established as shown in FIGURE 3d, from the supply 38 through passages 77, 78, 73 in the valve 36, lines 79, check valve 85 and lines 80, 81 to the hydraulic ram 24; the ram is extended and the drum raised until the valve is again manipulated, or until the drum reaches its maximum height. It will be noted that the valve 34 is bypassed in this action.

If the operator wishes to hold the drum in elevated position, he moves the lever 66 to the hold position 66a, shifting the valve 36 and setting up an active circuit as represented in FIGURE 3e which includes the passages 77, 82, 72, 83, 84 in the valve 36, in return to the reservoir 38. The fluid is held in the ram 24 by a check valve 85.

When it is desired to lower the drum 12 under manual control, the operator moves the lever to position 66c which shifts the valve 36 to the position shown in FIGURE 3f. A relief line from the hydraulic ram is thus set up through lines 81, 110 to the automatic valve 34 which includes passages 88, 89, 90 and 91. As noted above, the spool in the valve 34 had been moved to its normal position under the action of the spring 58 and in this position the passages 88, 89 are rendered active. The relief line from the hydraulic ram then continues through passages 89, 94, 96, line 79, passages 75, 98 in the valve 36, to the return line 84. Meanwhile, the pumped fluid flows through the passage 77, check valve 100, passages 78, 76 in the valve 36, line 102, check valve 104, the passages 108, 112, 88, 106, 96 in the valve 34, line 79, the passages 75, 98 and line 84.

As noted above, the lever 66 can assume either of the two positions 66c, 66d with the same function of the valve 36. In manual control, the operator will, for example, move the lever 66 into engagement with the yieldable abutment 71, but if he wishes the automatic control to take over, he forces it into position 66d where it is retained by the detent 68 until again manually moved out of that position. It will be noted that this valve 36 remains in this last position throughout the various phases of the automatic control, as represented in FIGURES 3a, 3b, 3c, the changes in these phases being produced by the automatic valve 34.

Reference is now made to the automatic valve 34. The valve 34 is controlled under the action of the plant lifter 14. It will be understood that as the plant lifter is raised by a projection in the ground, the control through the valve 34 is effective for raising the drum 12, and conversely when the plant lifters lower in response to a depression in the ground, the control through the valve is effective for lowering the drum 12. The control incorporates therein a time factor whereby the raising and lowering movements of the drum take place along the path at the point corresponding to the initial movements of the plant lifters.

In referring to FIGURE 3a, the circuit here shown represents raising action, i.e., the plant lifter 14 has been raised and the valve 34 shifted to the left to the position represented in FIGURE 3a. A pressure line is thus established to the hydraulic ram through passages 77, 78, 76, 102 in the valve 36, passages 108, 91 in the valve 34, and lines 110, 81 to the hydraulic ram 24. Reverse flow from the pressure on the hydraulic ram is prevented by a check valve 112' in the passage 108.

The hold or neutral condition is represented in FIGURE 3b. On even ground, the plant lifter assumes a normal or middle position, and in such condition the drum 12 need not raise and lower, but can be held in a predetermined position according to the circuit of FIGURE 3b. When the plant lifter is in such position on even ground, the valve 34 is moved to the position represented in FIGURE 3b, or its central position, in which the passage 90 therein is actively in circuit. This hold circuit includes passages 77, 78, 76, 102 in the valve 36, passages 105, 90, 106, 96 in the valve 34, line 79, passages 75, 98, 84 in the valve 36. In this hold condition, the pressure from the hydraulic ram 24 is withstood by the check valve 85 in the line 80.

When the plant lifter 14 then dips into a depression in the ground, the consequent lowering action moves the valve 34, or permits it to be moved by the spring 58, to the position shown in FIGURE 3c and in such position, a relief line is established from the hydraulic ram permitting the ram to lower. This relief line is from the ram through lines 81, 110, passages 89, 94, 96 in the valve 34, line 79, passages 75, 98, 84 in the valve 36. Meanwhile, the fluid pumped by the pump flows through passages 77, 78, 76, 102 in the valve 36, passages 108, 112, 88, 106 in the valve 34, and into the relief line from the hydraulic ram; namely, passage 96 in the valve 34, line 79, passages 75, 98, 84 in the valve 36.

The arrangement includes a single manual valve 36 which serves the dual function of controlling the automatic valve 34 from the standpoint of rendering the valve 34 active or inactive and also for controlling the specific movements in the manual control. A single lever 66 is provided and solely by the manipulation of this lever, all of the controls are effective. The manual valve, when placed in lower position, enables the drum to lower of its own accord, and effectively put out of the control of the manual valve, and in this condition, the automatic valve takes over and performs the various function. The control steps in the control of the automatic valve utilize the channels formed in the hydraulic circuit by the manual valve in its lower or inactive position.

Figure 4:
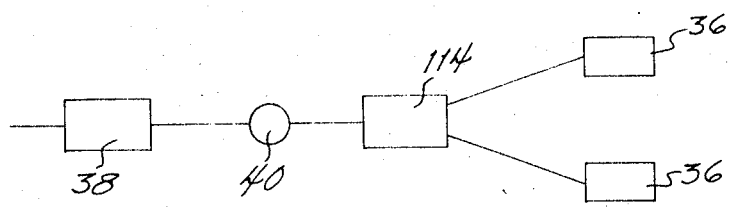
FIGURE 4 is a diagrammatic illustration of the system applied to a plurality of picker units.

The invention is applicable to multiple picker units 10, as shown in FIGURE 4, which includes the same common pump 40 and a pair of manual valves 36. A common fluid supply 38 is provided and a flow divider 114 provides the fluid for the individual valves 36.

We claim:
1. In a farm implement having a mobile frame, a vertically positionable harvesting unit mounted on said frame, hydraulic means for selectively manually and automatically controlling vertical positioning of said harvester unit, said means comprising a hydraulic pressure system having supply and return pressure portions, a manually positionable control valve connected to said supply and return portions, hydraulic lifting means connected between said frame and harvester unit for lifting said unit in response to a pressure difference between said supply and return portions, an automatically operatable control valve in said system and in supply and return relation with said lifting means and including ground sensing means responsive to ground contour to operate said automatic valve to selectively apply supply pressure to said lifting means, said manual valve selectively positionable in a first position to connect it in independent supply relationship to said lifting means and in a second position to connect it in independent supply relationship to said automatic valve to selectively effect respective manual and automatic lifting of said harvester unit, and said lifting means connected in return relationship to said manual valve through said automatic valve so that a lowering of said harvester unit is dependent upon the positioning of said automatic valve by said sensing means and said automatic valve thereby is operative to maintain the harvester unit in a vertical position independent of a supply pressure.

2. The invention according to claim 1 and said manual control valve having another position connecting said supply portion to the return portion and blocking fluid flow to and from said automatic valve and said lifting means and bypassing the automatic valve and the lifting means to hold the unit in a selected vertical position independent of supply pressure.

3. The invention according to claim 2 and said automatic valve having a first, second and third position, and said ground sensing means operatively connected to the automatic valve to position it relative to corresponding ground contour, said first position connecting the supply portion to said lifting means in response to a rise in ground contour to effect lifting of said unit, said second position connecting the supply portion to the return portion and blocking fluid flow to and from said lifting means to hold said unit in response to said unit obtaining optimum height, said third position connecting the supply portion and lifting means to the return portion in response to a drop in ground contour to effect lowering of said unit.

4. The invention according to claim 3 and said ground sensing means comprising a ground riding shoe adapted to follow the contour of the ground, linkage connecting said shoe and automatic valve to translate changes of ground contour into one of the corresponding automatic valve positions relative to an instant vertical position of said unit to effect positioning of said unit at the optimum height.

5. The invention according to claim 4 and said lifting means comprising a hydraulic ram having a casing connected to said frame and a movable piston slidably disposed within said casing, said piston operatively connected to the unit to vertically position it relative to a quantity of hydraulic fluid within said casing.

References Cited

UNITED STATES PATENTS

| | | | |
|---|---|---|---|
| 2,972,847 | 2/1961 | Matthews | 56—11 |
| 3,088,264 | 5/1963 | Sallee | 56—11 X |
| 3,196,599 | 7/1965 | Meiners et al. | 56—11 |
| 3,267,653 | 8/1966 | Dawalt et al. | 56—11 |
| 3,309,852 | 3/1967 | Allen | 56—208 |
| 3,312,048 | 4/1967 | Annat et al. | 56—214 |

ROBERT PESHOCK, Primary Examiner

P. A. RAZZANO, Assistant Examiner